United States Patent [19]

Lanciault

[11] 4,098,263
[45] Jul. 4, 1978

[54] SOLAR WATER HEATER FOR TRAILERS AND BUILDINGS

[76] Inventor: Joseph A. Lanciault, 520 Main St., Apt. 508, Fitchburgh, Mass. 01420

[21] Appl. No.: 799,703

[22] Filed: May 23, 1977

[51] Int. Cl.² .............................................. F24J 3/02
[52] U.S. Cl. .................................. 126/271; 126/270; 237/1 A
[58] Field of Search ............... 126/270, 271; 237/1 A; 350/168, 259, 261, 265; 240/106.1, 106 R

[56] References Cited

U.S. PATENT DOCUMENTS

| 1,068,650 | 7/1913  | Harrison     | 126/271 |
| 1,672,750 | 6/1928  | Christiansen | 126/271 |
| 3,012,477 | 12/1961 | Lodge        | 350/259 |
| 3,363,618 | 1/1968  | Dominguez    | 126/270 |
| 3,595,216 | 7/1971  | Lanciault    | 126/271 |
| 3,985,116 | 10/1976 | Kapany       | 126/270 |

Primary Examiner—William F. O'Dea
Assistant Examiner—Larry Jones

Attorney, Agent, or Firm—Victor J. Evans & Co.

[57] ABSTRACT

The following invention relates generally to a solar water heater apparatus adapted for use particularly in housetrailers or mobile homes having curved roof surfaces as well as houses whose top portion also has a contour. Plural twin-storage tanks for water are disposed on these roof tops, and they are suitably dark colored to absorb the sun's radiation. Conduits and valves associated with these storage tanks allow for the transition of heated liquid within the tank to a point remote therefrom for subsequent use, and also include valve and conduit means for replenishing the water contained in the tanks. Preferably a pair of such twin-tanks are installed at the apex of curvature on a roof top, and support members co-act with each of the tanks to provide balance on the apex. The tanks are supported on insulating means, and overlying said tanks and spaced therefrom is an overlying canopy which serves to intensify, magnify, and retain the sun's thermo radiation.

8 Claims, 15 Drawing Figures

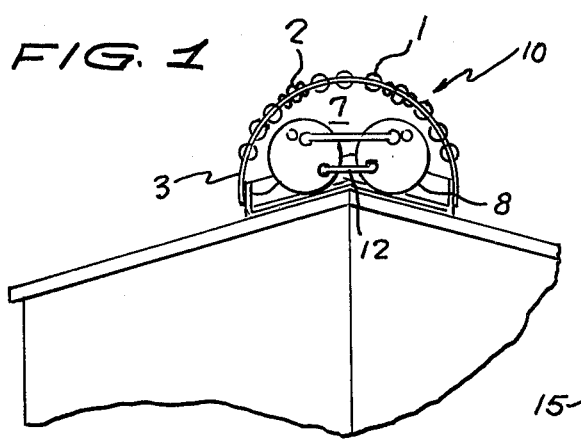
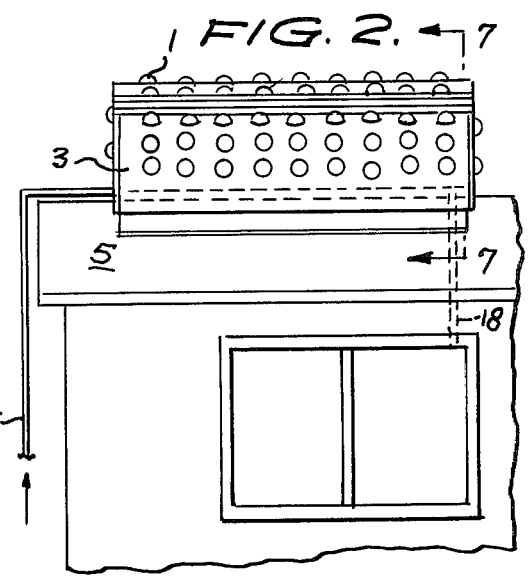
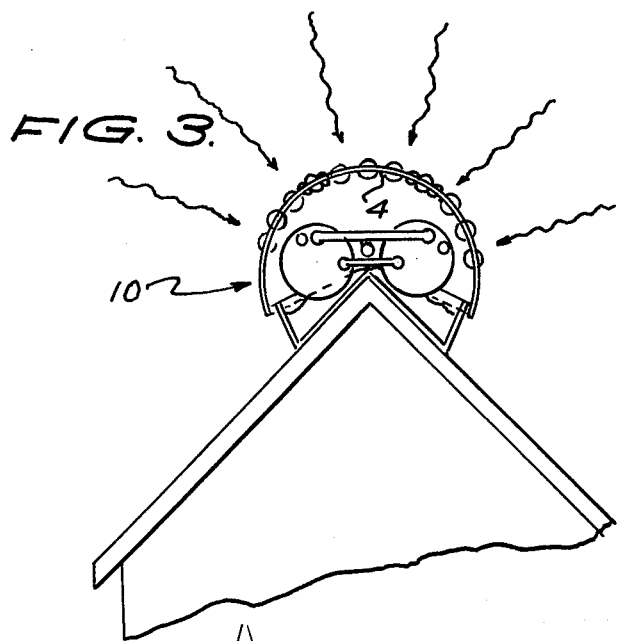
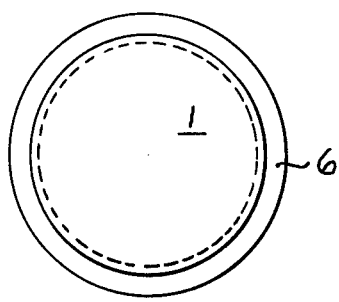
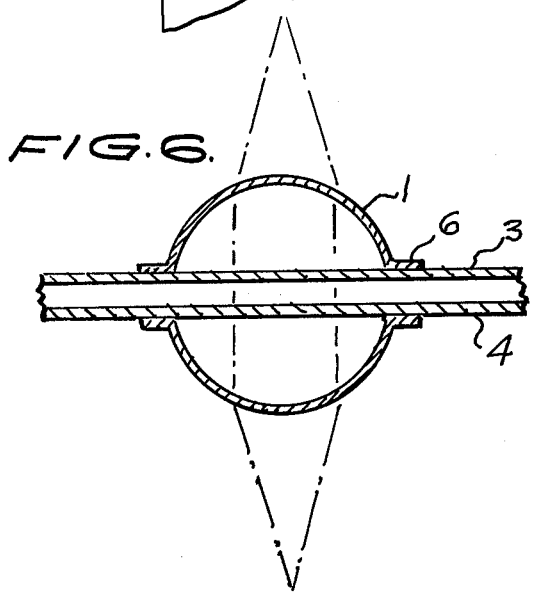
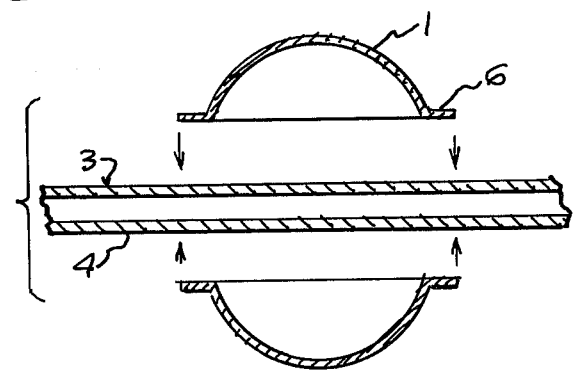

SOLAR WATER HEATER FOR TRAILERS AND BUILDINGS

BACKGROUND OF THE INVENTION

1. Field of the Invention

This invention relates generally to an apparatus for intensifying the sun's thermo radiation, as well as improved means for storing and distributing the water so heated by the sun's thermo radiation.

Prior art devices which include generally flat plate type solar heat water tanks suffer from their inability to receive maximum radiation from the sun at all points in the sky unless they are being constantly re-oriented. Re-orientation of these flat plate collectors involves a considerable additional expense due to the associated hardware necessary to bring about such transition of these plates, and they still fail to provide the efficiency available in the present invention, especially when the sun is low in the horizon.

SUMMARY OF THE INVENTION

Accordingly, the present invention obviates the need for complex hardware associated with orienting the tanks to the most beneficiary angle with respect to the sun by providing an overlying canopy over a pair of generally cylindical water storage tanks, and provides this canopy with means for focusing, magnifying and intensifying the heat-wave radiation from the sun onto these tanks, regardless of the sun's position in the sky.

OBJECT OF THE INVENTION

Therefore, it is an object of this invention to provide a thermo apparatus which utilizes the sun's thermo radiation regardless of its position in the sky.

It is another object of this invention to provide a solar storage tank which focuses, magnifies and intensifies the sun's radiation upon the water-storage facilities.

Still a further object of this invention is to provide a solar heating water-storage device which is installed on the roof-top surface of a building or house-trailer with inherent stability.

Another object of this invention contemplates having the intensification canopies serve as an insulative barrier to retard the emission of stored solar energy in the storage-tanks back out to ambient atmosphere, when the sun has gone down, or in cloudy weather.

A further object of this invention contemplates providing a solar water heater particularly disposed and suitable for house-trailers which comprises a low profile, stream-lined contour.

Other objects and advantages will become apparent in the following specification when considered in light of the attached drawings.

BRIEF DESCRIPTION OF THE DRAWINGS

FIG. 1 shows a front view of the solar water heater and storage facility installed upon a roof-top having a relatively minor apex at its highest point;

FIG. 2 is a side view thereof;

FIG. 3 is an end view similar to that shown in FIG. 1 in which the solar water tanks are installed upon a roof having a severe slant as contrasted to FIG. 1, and shows the solar radiation impinging upon the storage tanks;

FIG. 4 shows a detailed top plan view of a disc type intensifier shown in FIGS. 1, 2 and 3;

FIG. 5 is an expanded sectional side view of the disc shown in FIG. 4;

FIG. 6 shows the disc of FIG. 5 in its assembled configuration;

DESCRIPTION OF THE PREFERRED EMBODIMENT

Figure 7:
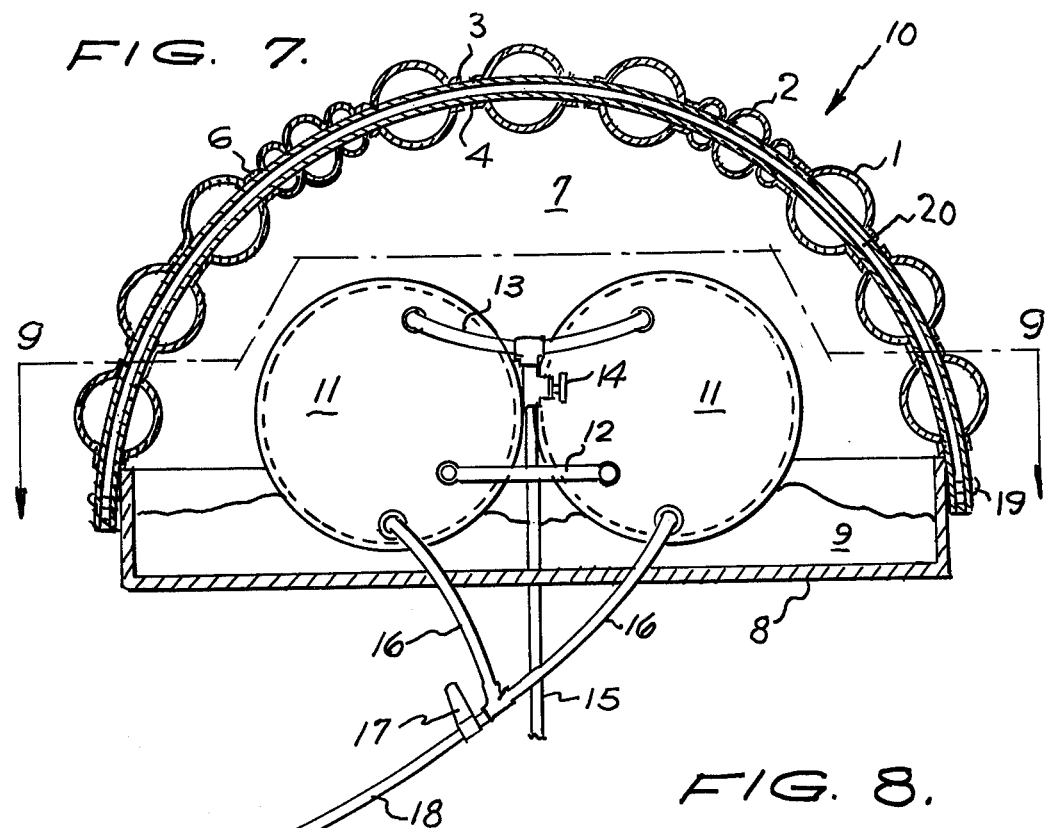
FIG. 7 is a sectional view taken along the lines 7—7 of FIG. 2.
Figure 8:
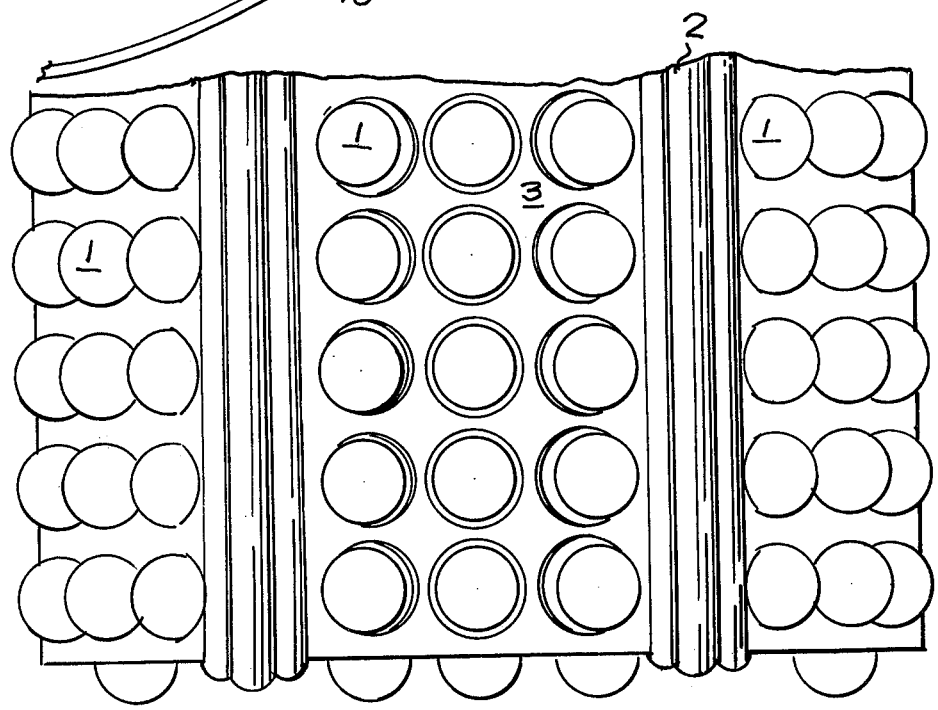
FIG. 8 is a top plan view showing a portion of the top roof overlying canopy shown in FIG. 7.
Figure 9:
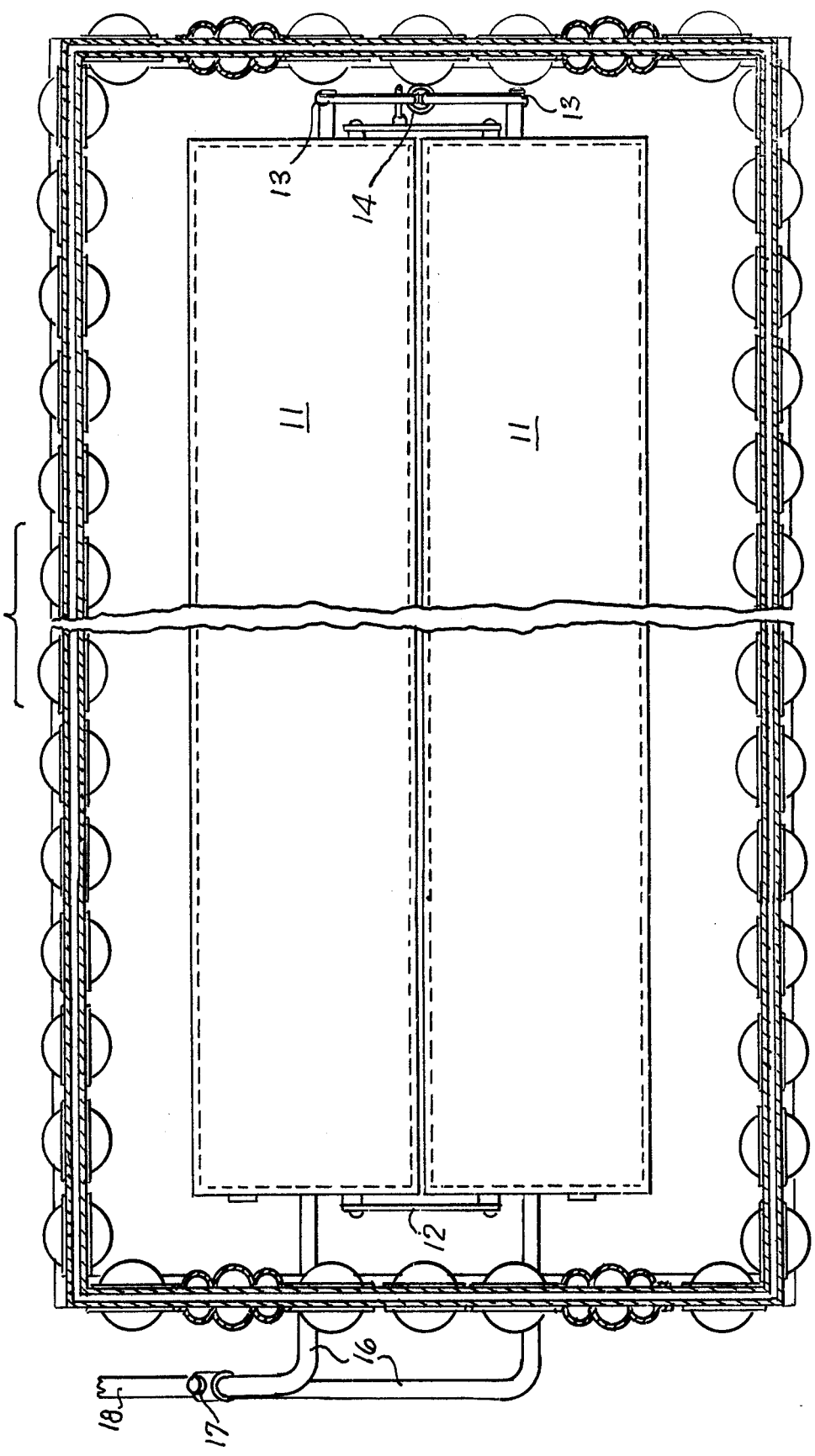
FIG. 9 is a top plan sectional view taken along the lines 9—9 of FIG. 7.
Figure 10:
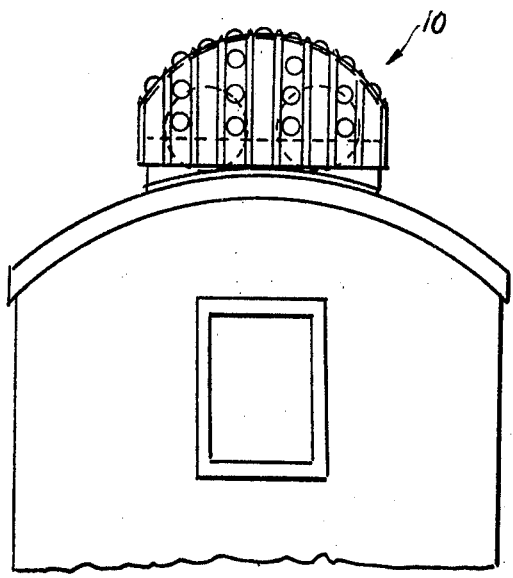
FIG. 10 is an end view of the solar water tanks installed on a structure having a curvilinear surface, and shows the contour detail of an end portion of the tank.
Figure 11:
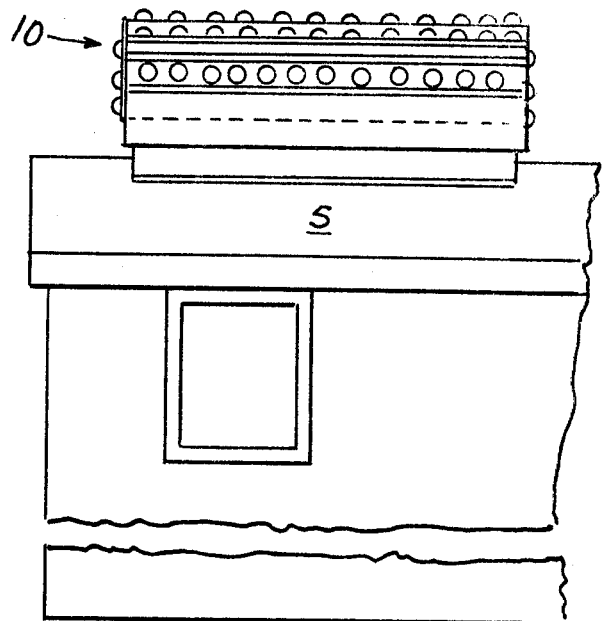
FIG. 11 is a side view of the tank of FIG. 10.
Figure 12:
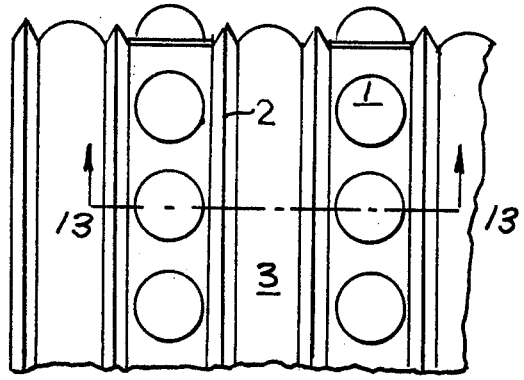
FIG. 12 shows a top plan view of the embodiment shown in FIG. 10 at its terminal point where the tanks curve downwardly to the roof surface.
Figure 14:
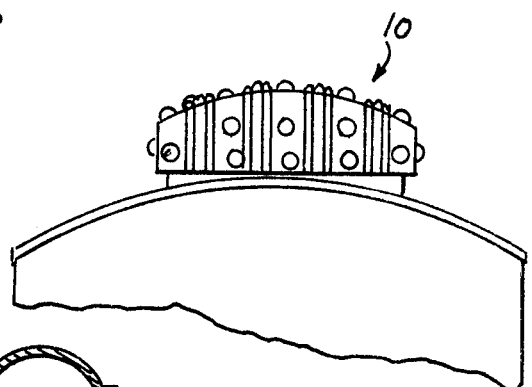
FIG. 14 shows an alternative stream-line configuration as contrasted with the one shown in FIG. 10.
Figure 13:
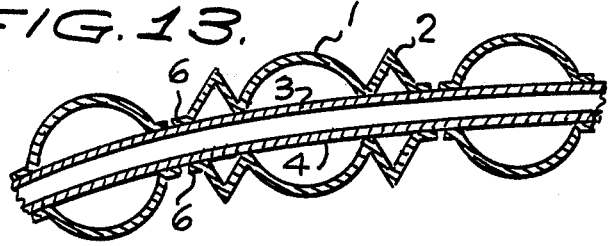
FIG. 13 is a sectional view taken along lines 13—13 of FIG. 12.
Figure 15:
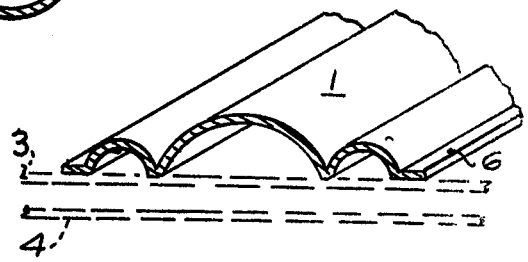
FIG. 15 shows a detailed fragmentary view of a portion of the intensifier best seen in FIG. 13.

Referring to the drawings now, wherein like reference numerals refer to like parts throughout the drawings, reference numeral 10 generally shows the solar water heater and tanks that comprise this invention.

Reference to FIG. 7 is hereby made which perhaps best shows the actuation of the thermo tanks in there position upon any suitable roof. Therein it will be noted that the tanks generally are comprised of twin-tanks 11 which are nested on any suitable insulative layer denoted by reference numeral 9 this insulation is formable, and provides a contour consistent with the cylindrical shape of these drums which are generally black in color. The insulation is contained within a box preferably made of a plastic material such as fiberglas, or the like, and is denoted by reference numeral 8 which terminates just beyond the point where a domed member overlaps. The dome 10 is comprised of two concentric canopies having an extent in the longitudinal or lengthwise greater than the tank and the outer canopy 3 is spaced from the inner canopy 4 and provided therein is an insulating air space denoted by reference numeral 20. The means of fastening this canopy assembly to the tray 8 is any conventional means, but in this specific embodiment brass rivets 19 are utilized. Both the outer and inner canopies have installed thereon a plurality of built-in discs numeral 1 and ridges numeral 2 which are made either of glass or plastic and serve to not only strengthen and brace the canopy, but also magnify, focus and pinpoint thermal radiation onto the twin water storage tanks 11 in much the similar manner as a magnifying glass, and/or a focusing lense would. The disposition of these hollow discs and ranges around the entire periphery of the canopy both on interior and exterior walls enhances and intensifies the sun's thermo radiation regardless of the sun's orientation or position in the sky.

An air space 7 separates the canopy assembly from the twin-tanks and as with air space 20, and the air spaces within the ridges and discs, serve as a most efficient insulative medium for retaining the temperature of the heated water stored in the two tanks after dark, or in the absence of bright sun-light.

Besides the support that the insulation material 9 affords the drums, they are balanced relative to each other when installed upon opposed sloping sides of a roof as perhaps best seen in FIGS. 1 and 3 by support rod 12 which connects between them and serves to provide additional stability to the twin-drums. Water is provided into the system through conduit 18 which transverses into the twin-drums 11, and valve 17 connected to conduit 18 functions as a pressure release valve should pressure within the drums reach above a critical level.

Hot water is disposed to the consumer via conduit 15 which collect and form one pipe line 13 just above the valve 14. Ventilation means which allow the canopy interior to communicate with the exterior or ambient air is contemplated as being included in this invention to remove condensation or other unwanted residue from within the air cavity 7. The details of construction for disposing the discs and ridges upon the substantially semicircular canopies 3 and 4 can best be viewed in FIGS. 4, 5, 6, 13 and 15. It will be noted that flange members 6 provide a surface whose contour is complementally formed with canopies 3 or 4 which therefore can be suitably affixed to said canopies by any known means, such as adhesive. In the illustration of FIGS. 1 2 and 3, the bottom face of tray member 8 can additionally be provided with sealing or adhesive means to firmly contact the roof surface 5 of the building or house-trailer to provide positive retention of the solar apparatus upon the roof. However it will be appreciated that the system in itself is balanced upon the apex by virtue of equalizing the amount of water in each tank through tube 16 and therefore provides balance along opposed sides of a roof, and its balanced support as was stated before is enhanced by support bar 12 which extends between the drums.

From the foregoing description it will be apparent that the novelty of the invention resides in part in the intensification and magnification of the sun's heat-waves provided by the discs and ridges disposed upon the concentric canopies and the curvilinear configuration of these canopies including a tapered portion along the forward and rearward portions of the tank to provide maximum exposure to the sun at any angle or position of the sun in the horizon as well as a stream-lined effect for utilization in or on vehicles in which aerodynamics is a consideration, such as mobile homes and trailers.

Having thus described the preferred embodiment of the invention it should be understood that numerous structural modifications and adaptations may be resorted to without departing from the spirit of the invention.

What is claimed is:

1. A solar water heater with heat-ray intensifiers comprising twin-tank water storage means, valve and conduit means connected to said storage means to permit ingress and egress of water, insulation means surrounding said twin water tanks, and a canopy overlying said water storage tanks provided with means on said canopy to focus, magnify, and intensify heat-wave radiation from the sun, said means on said canopy includes on its outer face a plurality of parallel rows of hemispherical discs and upstanding ridges having air pockets therein disposed upon said outer surface, said canopy defines a curvilinear surface which can therefore utilize radiation from all angular positions of the sun.

2. The apparatus of claim 1 in which said insulation means comprises in part resilient formable insulation located below said twin-tanks to serve as a nesting medium for said twin-tanks, and a tray surrounding said last named insulation connected to said canopy.

3. The apparatus of claim 2 in which said insulation includes at least one air pocket above said twin-water tanks and below said canopy.

4. The apparatus of claim 3 in which there is a second curvilinear canopy concentric with said first curvilinear canopy separated by an air space between them which serves to provide further insulation because of said air space.

5. The apparatus of claim 4 in which said second inner-canopy has disposed on its inward surface and relative to said twin-water tanks curvilinear surface a plurality of discs for further intensification and magnification of the sun's thermo radiation.

6. The apparatus of claim 5 in which said second, or inner canopy further comprises ridges disposed on its inner face for providing still further intensification and magnification of the sun's thermo radiation.

7. The apparatus of claim 6 in which the twin-tanks are supported together by a support rod.

8. The apparatus of claim 7 in which the apex of an inverted roof building roof nests between said tanks and below said support rod.

* * * * *